United States Patent Office 3,382,952
Patented May 14, 1968

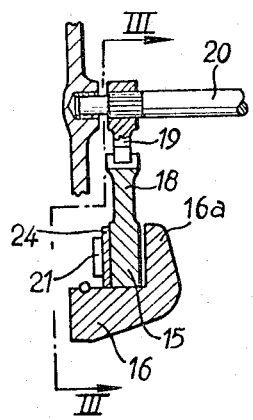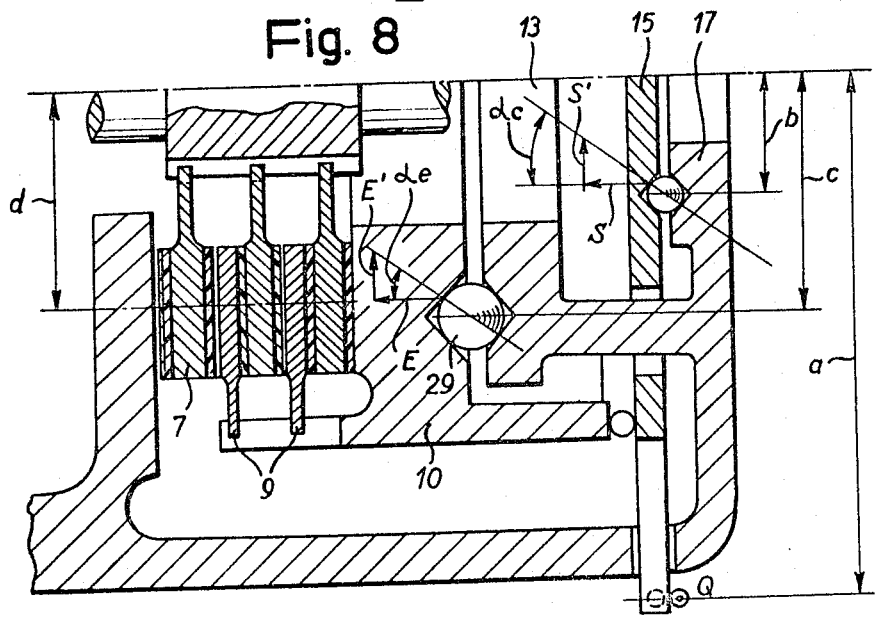

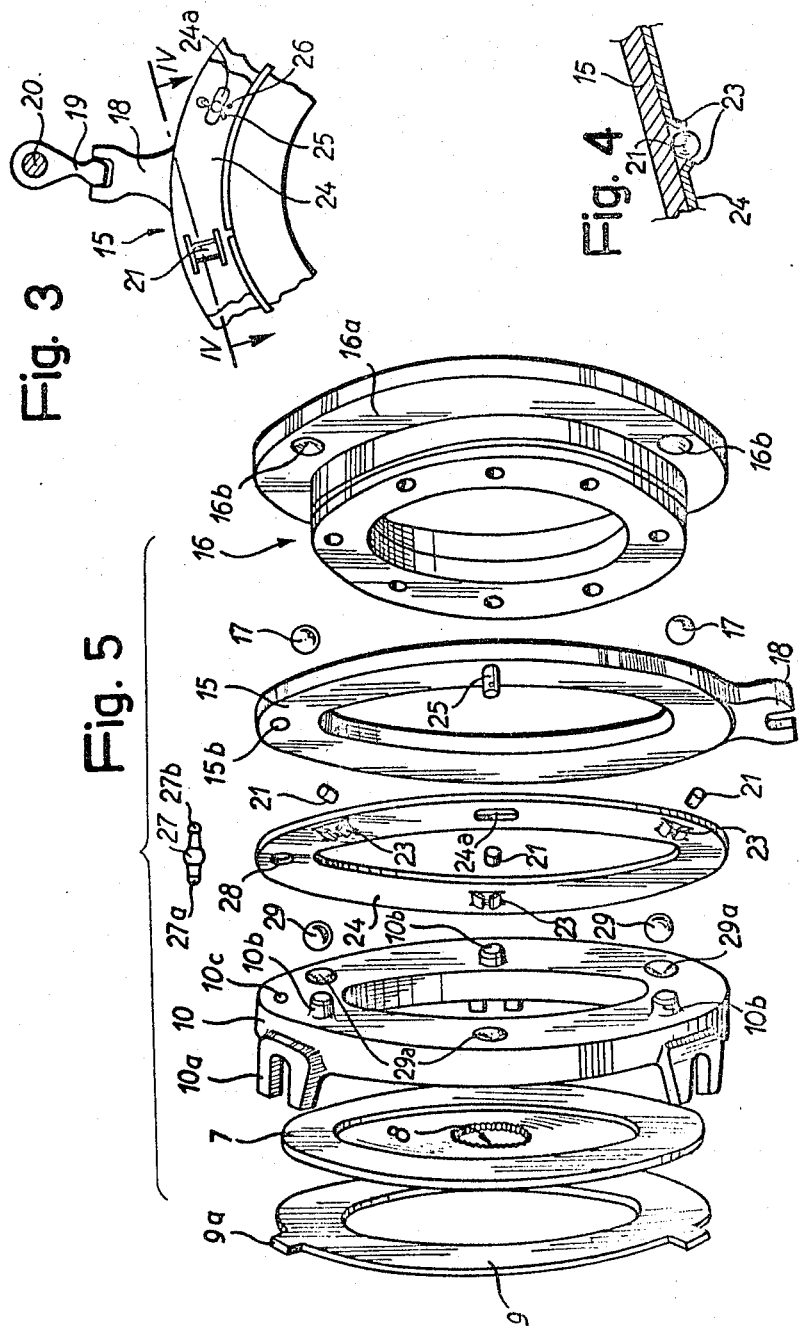

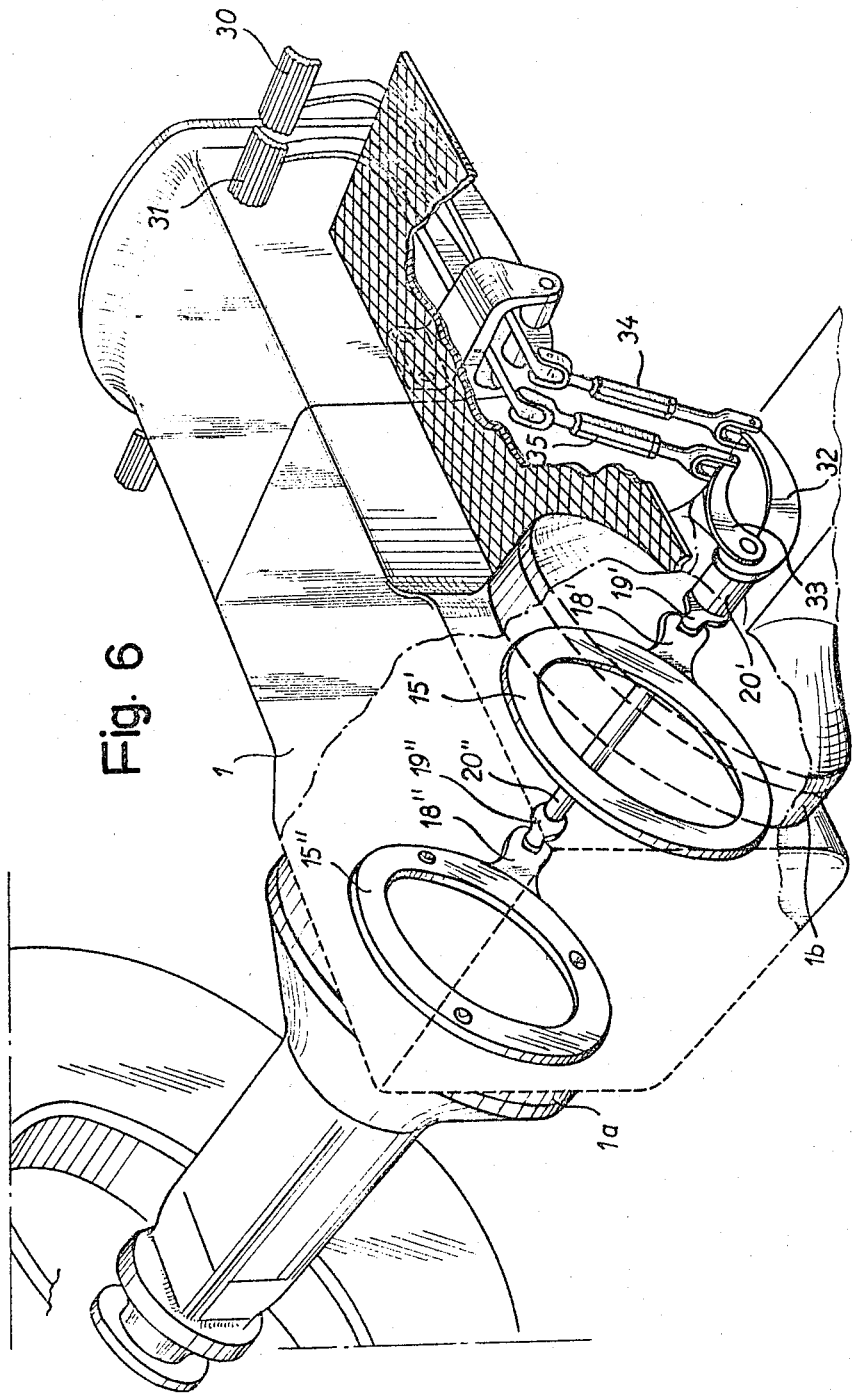

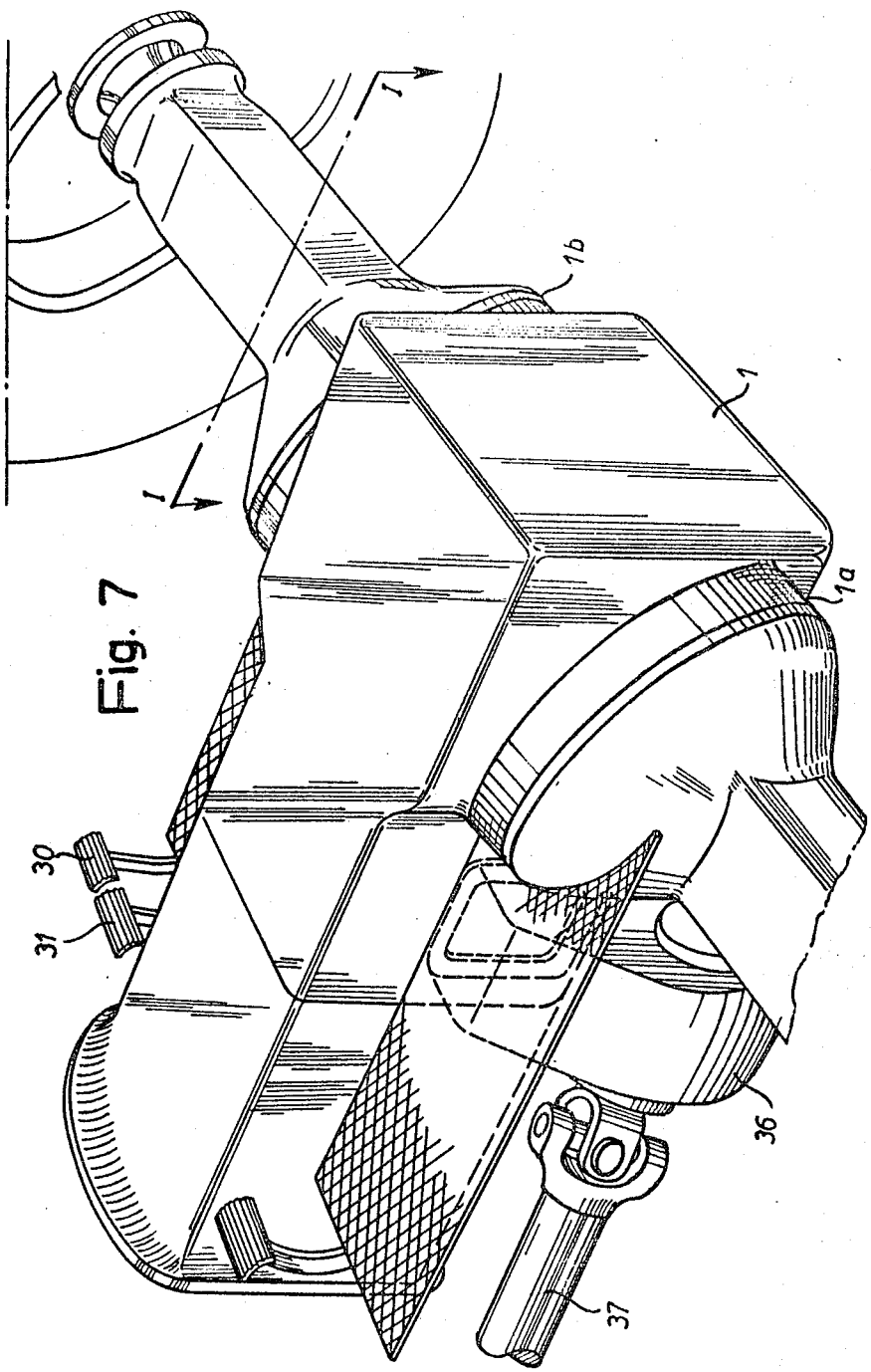

3,382,952
SELF-ENERGIZING MULTIPLE DISC BRAKES
Giorgio Grattapaglia, Turin, Italy, assignor to Fiat Società per Azioni, Turin, Italy
Filed Mar. 24, 1967, Ser. No. 627,585
Claims priority, application Italy, Mar. 28, 1966, 7,332/66
10 Claims. (Cl. 188—72)

ABSTRACT OF THE DISCLOSURE

The annular brake discs of a multidisc brake, one part of which is splined on the shaft to be braked are pressed therebetween and against a stationary annular surface by axially displacing towards said brake discs an annular pusher member. The axial displacement of the latter is obtained by rotating an annular operating disc abutting at one side said pusher member and at its other side a series of balls arranged in conical seatings provided in said operating disc and respectively in a radial annular shoulder adjacent said disc. The braking effect is enhanced by the action of a second series of balls arranged in conical seatings provided at the side of said pusher member opposite said annular brake discs and, respectively, in an annular stationary shoulder adjacent said pusher member.

---

The invention relates to multiple disc brakes for wheeled tractors, more particularly for agricultural purposes.

It is known that development of modern constructions of wheeled tractors imposed upon such vehicles also the use of disc brakes as a consequence of the adoption of quick running engines and light weight transmissions with considerably high reduction ratios, which should be kept within moderate size limits.

More particularly, the use of multiple disc brakes was introduced, in which the braking action is distributed over the operative surface of the various discs, the diameter of which can therefore be kept within reduced limits in order to avoid an excessive increase in size of the transmission with respect to the line above the ground.

Multiple disc tractor brakes of the known type each comprise a bell-shaped casing each surrounding one of the rear axle shafts and externally supported by the opposite side walls of the case enclosing the propeller shaft and differential unit, which contains two rotating discs at least provided with friction surfaces fast in rotation with the stub axle of each wheel and two actuating discs at least having interposed therebetween a plurality of balls seated in conical recesses, which upon a relative rotation of the actuating discs, axially push the rotating discs against cooperating operative front surfaces of the said casing.

These disc brakes are open to the objection of axial clumsiness of the bell-shaped housing, which is attributable more particularly to the kind of the actuating assembly.

A further drawback of the said brakes resides in the fact that, still owing to the type of the means operating the rotating discs, one face only of the brake discs may be utilized for setting up the torque which performs the self-braking action by its conversion to an axial thrust on the disc set. Consequently, with oil-submerged brakes with low value of the friction coefficient the number of disc faces must be increased and the torque effecting self-braking is a small fraction of the total torque, and considerable amplifications of the resulting moderate tangential effort have to be resorted to in order to obtain a proper axial effort such as to yield the desired self braking effect. The amplification of the said effort results in brakes of the known type in an increase in ratio of the pedal stroke to the stroke of the brake operating member, hence the necessity for more frequent adjustment of the brake.

A further drawback of the said known brakes resides in the fact that, owing to their arrangement externally of the case enclosing the propeller shaft and differential unit, each of them requires a separate operating linkage and each operating rod has to be placed on the respective flank of the said case, which prevents an arrangement parallel to one of the said case flanks of a secondary propeller shaft transmitting motion to the fore wheels.

The invention improves multiple disc brakes of the abovementioned type in order to obviate the above recited drawbacks.

An object of the invention is to provide a brake of the type refered to, wherein the self-braking effect can be predetermined in order to restrain the braking effort within even very narrow limits. Considering that the brake should operate in an oil bath, hence with a number of discs in order to make up for the low value of the friction coefficient, the torque acting on all disc faces but one is proposed to be utilized for setting up the self-braking effect without resorting to large amplifications.

A further object of the invention is to provide a brake, the operating arrangement of which may be placed in nearest proximity to the differential unit in order to both limit the axial dimension of the brake and permit installation of the operating linkage on one side only of the case enclosing the propeller shaft and differential unit, the other side of which can be utilized for installing the propeller shaft transmitting motion to the fore wheels and/or for installing a power take-off.

A further object of the invention is to provide a multiple disc brake which is particularly efficient, whereby the disc diameter may be kept small so that the brake itself can be located within the said case adjacent the differential unit in order to prevent access of foreign bodies and water between the friction surfaces, and to thereby maintain unaltered the braking effectiveness as well as to permit an efficient dispersion of friction heat through the lubricating oil for the differential unit.

With the above and further objects in view which will appear from the appended description, the invention provides a multiple disc brake comprising a first set of movable braking discs lined with frictional material on their front faces and fast in rotation with the stub axle of the wheel, a further set of brake discs fast in rotation with a pusher member, an operating disc coaxial with said pusher member and axially spaced there-from, means for transmitting axial thrust between said operating disc and said pusher member, a stationary body rotatably supporting the said operating disc, a radial wall on said body adjacent said operating disc, a first set of balls interposed between the conical walls of recesses provided in the surfaces facing each other of said operating disc and said radial wall, adapted to act on the said operating disc upon rotating the latter so as to displace it towards the said pusher member and to displace the latter jointly for applying it against the brake disc; a second set of balls interposed between the said pusher member and a stationary partition, each received by conical recesses provided in the walls facing each other of said pusher member and said stationary partition, adapted to act on the pusher member and further displace it towards said brake discs on the angular displacement thereof due to the torque transmitted thereto by the said brake discs and means associated with the operating pedal for angularly moving the said operating disc.

Further characteristic features and advantages will be understood from the appended detailed description referring to the accompanying drawings given by way of example, wherein:

FIGURE 2 is a sectional detail view of the brake operating member.

FIGURE 3 is a sectional view on line 3—3 of FIG. 2.

FIGURE 4 is a sectional view on line 4—4 of FIG. 1.

FIGURE 5 is an exploded perspective view of the brake components.

FIGURE 6 is a perspective view showing diagrammatically from the outside the case shown in FIGURE 1 on the side carrying the brake operating linkage.

FIGURE 7 is a perspective view similar to FIG. 6 showing the opposite side of the said case and FIGURE 8 is a diagrammatical axial sectional view of the brake.

Figure 1:
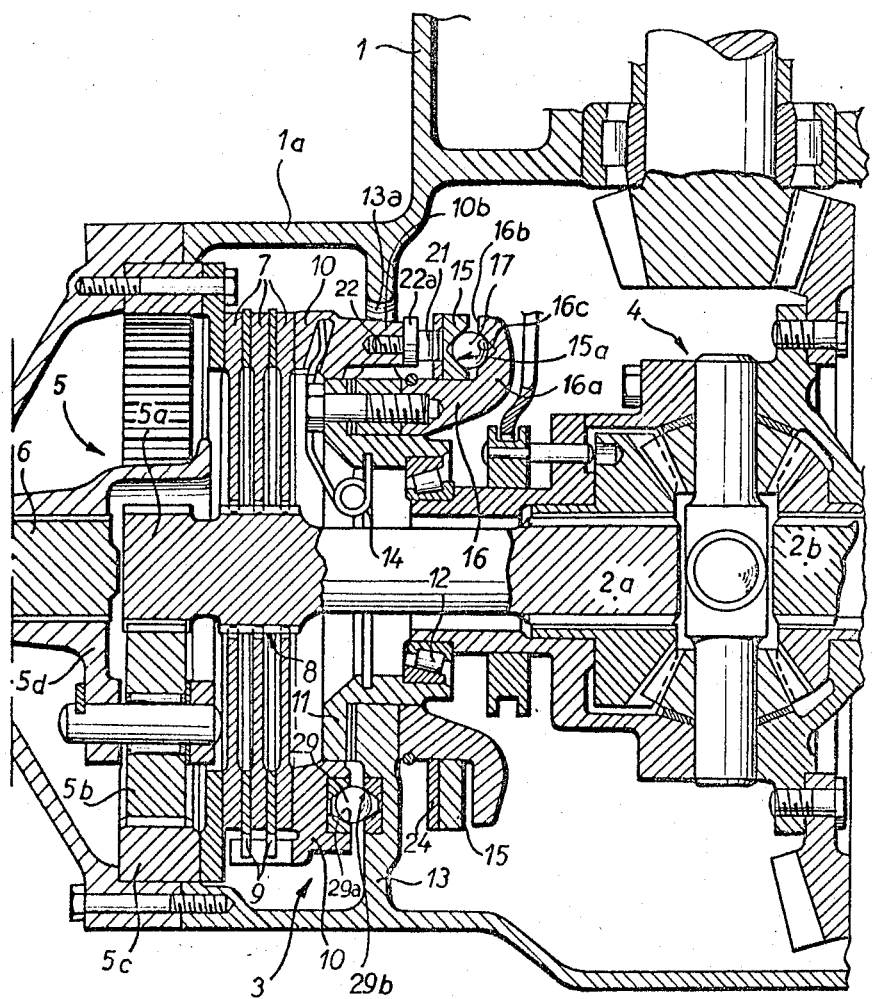
FIGURE 1 is a part longitudinal section of the case enclosing the propeller shaft and differential unit, being part of the body of a tractor, taken on the line 1—1 of FIGURE 7 and showing the brake according to the invention.

The case 1 enclosing the propeller shaft and differential unit 4 and being part of the body of a tractor, is formed at its rear end with two cylindrical recesses 1a–1b enclosing the brakes generally indicated as a whole by 3 and each associated with one of the stub axles, 2a–2b respectively.

The brakes are mounted on the stub axles between the opposite sides of the differential unit 4 and the reducing gears 5 one of which is shown in FIGURE 1. The latter is of the epicyclic type and comprises a sun wheel 5a fast with the stub axle 2a, one or a plurality of planet wheels 5b meshing with a toothed rim 5c and rotatably supported by a planet cage 5d keyed to a secondary stub axle 6.

According to the invention each brake comprises a first set of movable brake discs, in the example shown three movable discs 7, lined with frictional material on their opposite front faces, fast in rotation with the stub axle 2a–2b of the respective wheel through a splined coupling 8, and a second set of intermediate brake discs 9 interleaved with said first set.

The discs 9 are fast in rotation with an annular pusher member 10 by effect of the interengagement of their radial wings 9a with cooperating forks 10a on the pusher. The pusher member 10 is freely rotatable on a stationary sleeve 11 supporting the bearing 12 surrounding the stub axle and axially abuts a stationary partition 13 formed inside the case 1, against which it is pressed by the action of at least one spring 14 adapted to maintain the said pusher member 10 normally spaced from the front surface facing it of the adjacent brake disc 7.

The pusher member 10 is acted upon by a further annular disc 15, which shall be referred to hereafter as operating disc.

The operating disc 15 is rotatably supported on a tubular body 16 provided with a radial flange 16a.

A first set of balls 17 are interposed between the operating disc 15 and a radial shoulder 16b, on said flange 16a, the said balls seating in conical recesses 15a, 16c cut in the disc 15 and flange 16a, respectively and being adapted to act on the operating disc 15 in order to move it towards the pusher member 10 and displace the latter and to apply it against the brake discs when the operating disc 15 is imparted an angular movement relatively to the flanged tubular body 16. The above mentioned angular movement of the operating disc 15 takes place upon depressing of the brake operating pedal, 30 or 31, respectively.

To this end the disc 15 is provided with a radial fork 18 (FIGURES 2, 3 and 5) having engaging therewith the head of a lever 19 splined on a shaft 20 connected to the operating pedal by a linkage which shall be described hereafter.

The engagement between the operating disc 15 and pusher member 10 is effected through the interposition of a plurality of rollers 21 acting on corresponding head portions 22a of bolts 22 screwed in tapped bores provided in projections 10b of the pusher member 10 extending through openings 13a in the partition 13. The provision of rollers 21 substantially reduces the driving action of the pusher member 10 on the operating disc 15.

The rollers 21 are received by recesses 23 (FIGURE 5) in a retaining annular rim 24 adjacent the disc 15 and held in position by pins 25 on the said disc, extending through arcuated slits 24a in the rim 24 and carrying split pins 26 for axial locking of the said rim against the disc 15. The rim 24 is therefore angularly displaceable with respect to the operating disc 15 over an angle defined by the width of the said slit 24a.

A beam 27 is interposed between the operating disc 15, rim 24 and pusher member 10 and has a middle spherical portion engaging a seat 28 in the rim 24 and its small spherical end heads 27a, 27b engaging seats 10c and 15b provided in the pusher member 10 and operating disc 15, respectively, in order to obtain that the rim 24 rotates upon relative rotation of the disc 15 with respect to the pusher 10, or vice versa, by an angle which is equal to one half of the relative angular displacement of said disc 15 and pusher 10, to thereby maintain the rollers 21 in contact with the head portions 22a of the bolts 22.

A further set of balls 29 are provided according to the invention between the pusher member 10 and rigid partition 13 in the case 1.

The balls 29 are accommodated by conical recesses 29a–29b in the pusher member 10 and partition 13, respectively (FIG. 1), and act therefore to further displace in an axial direction the pusher member 10 when the latter is urged to rotate by the brake discs.

The balls 29 therefore act on the pusher member 10 in order to effect a self-braking action which adds to the breaking action obtained by depressing the brake pedal.

This self-braking action is independent of the sense of rotation of the brake discs and is therefore equally operative in either direction of drive of the vehicle.

The extent of self-braking depends upon the value of the transmitted torque and upon the geometry of the arrangement and may therefore be predetermined in order to reduce the required braking effort within limits variable at will.

Referring now to FIGURE 8, which diagrammatically shows the unit comprising the pusher member 10 and operating disc 15, and assuming that Q is the control action by the lever 19 on the fork 18, $a$ the spacing of the head of the lever 19 and axis of the operating disc 15, $b$ and $c$ the spacing of the balls 17 and 29 from the said axis of the disc 15, the axial thrust S transmitted by the balls 17 to the pusher member 10 is given by the following relation:

$$S = S' \cot g\, \alpha_c$$

$\alpha_c$ being the angle of conicity of the recesses 15a–16c for the balls 17 and $$S' = Q\frac{2a}{b}$$

the radial component of the transmitted effort.

Similarly, the axial thrust K exerted by the balls 29 on the pusher member 10 is given by the following relation:

$$E = E' \cot g\, \alpha_e = M\frac{2n-1}{nc} \cot g\alpha_e$$

$\alpha_e$ being the angle of conicity of the seat 29a–29b for the balls 29, M the torque acting on the brake and $n$ the number of brake discs.

Assuming $f$ denotes the friction coefficient of the brake discs and $d$ the mean radius of the said discs, the total braking torque is given by the relation $$M = (E+S)f.n.d. =$$
$$\left( Q\frac{2a}{b} \cot g\alpha_c + M\frac{2n-1}{nc} \cot g\, \alpha_e \right) f.n.d$$

from which the value of the braking effort $$Q = \frac{Mb}{2a \cot g\, \alpha_o f.n.d.} \left(1 - \frac{2n-1}{c} \cot g\alpha_o f.d\right)$$

is obtained.

Consequently, the nil self-braking condition is obtained at $\cot g\, \alpha_e = 0$, that is $\alpha_e = 90°$, vice versa, the undesired, dangerous, "total" self-braking or self-locking condition, is obtained when $$\frac{2n-1}{c} \cot g\alpha_o fd \geq 1$$

It will therefore be understood that, in accordance with the object of the invention, the self-braking effect may be predetermined at will by varying the angle of conicity $\alpha_e$ without increasing the diameter and number of the brake discs so that the overall size of the brake is kept within moderate limits.

As disclosed above an independent operating pedal 30, 31, respectively, is associated with each brake. These pedals 30 and 31 act to effect rotation of a shaft 20', 20'', and, respectively, carrying a lever 19', 19'', respectively, which rotates the operating discs 15', 15'' respectively (FIG. 6).

The shaft 20' is hollow and advantageously encloses a coaxial shaft 20'', so that both shafts can be operated at one and the same end which is brought to the outside on a flank of the case 1; the inter-connection of the shafts 20' and 20'' with their operating pedals 30, 31, respectively, is effected through the interposition of levers 32, 33, respectively, and adjusting links 34, 35, respectively.

The opposite side of the case 1 (FIGURE 6) can therefore be advantageously used for installing a power take-off generally denoted by 36, more particularly for installing a secondary propeller shaft 37 adapted to transmit motion to the fore wheels of the tractor, not shown on the drawing.

It will be understood that, within the principle of the invention, embodiments and constructional details may be widely varied with respect to the example described and shown without departing from the scope of the invention defined by the following claims.

What I claim is:

1. A multiple disc brake for wheeled tractors, more particularly for agricultural purpose, characteized by compising a first set of movable brake discs lined with friction material on their front faces, fast in rotation with the stub axle for the wheel, a further set of brake discs fast in rotation with a pusher member, an operating disc, coaxial with said pusher member and axially spaced therefrom, means for transmitting axial thrust between said operating disc and said pushing member, a stationary body rotatably supporting the said operating disc, a radial wall on said body adjacent said operating disc, a first set of balls interposed between conical walls of recesses provided in the surfaces facing each other of the operating disc and said radial wall, adapted to act, on the said operating disc upon rotating the latter so as to displace it towards the said pusher member and to displace the latter jointly for applying it against the brake discs, a second set of balls interposed between the said pusher member and a stationary partition, each received by conical recesses provided in the walls facing each other of said pusher member and said stationary partition, adapted to act on the said pusher member, and to further displace it towards the brake discs on the angular displacement thereof due to torque transmitted thereto by the said brake discs, and means associated with an operating pedal for angularly moving the said operating disc.

2. A brake as claimed in claim 1, wherein the said pusher member is supported freely rotatable on a sleeve carrying the bearing for the stub axle for a wheel, and axially abuts a stationary partition in the case enclosing a propeller shaft and differential unit.

3. A brake as claimed in claim 2 wherein the said pusher member is pressed against the said partition by one spring at least adapted to maintain the said member normally spaced from the front surface of the adjacent movable brake disc.

4. A brake as claimed in claim 1, wherein the said operating disc is rotatably supported on a tubular body coaxial therewith and axially abuts a radial flange on said tubular body.

5. A brake as claimed in claim 1, wherein the said operating disc is provided with a radial fork engaging the head of a lever splined on a shaft connected with the brake operating pedal, whereby lowering of the said pedal effects an angular displacement of the said disc.

6. A brake as claimed in claim 1, wherein the said means for transmitting thrust from said operating disc to said pusher member comprises rollers seated in recesses provided in the said operating disc and acting on head portions of bolts fast with the pusher member.

7. A brake as claimed in claim 6, wherein the said seats for the rollers are formed in a retaining rim adjacent the operating disc and retained by the action of the pins on the operating disc cooperating with arcuated slits in the rim and with split pins for axial lock, the said rim being angularly displaceable with respect to the operating disc over a width defined by the width of the said slits.

8. A brake as claimed in claim 7 characterized by comprising between the said operating disc, rim and pusher member a beam having a middle spherical portion engaging a seat in the rim and having its opposite ends engaging corresponding seats in the operating disc and pusher member, respectively, in order to obtain that the rim rotates upon relative rotation of the operating disc with respect to the pusher member, or vice-versa, by an angle which is equal to one half of the relative angular displacement of said disc and pusher member.

9. A brake as claimed in claim 1, wherein the conical recesses for the second set of balls, in the pusher member and stationary partition, are of an angle of conicity $\alpha_e$ such as to fulfil the unequality relation $$0 \geq \frac{2n-1}{c} \cot g\, \alpha_e fd \leq 1$$

wherein $n$ denotes the number of brake discs, $f$ the friction coefficient, $d$ the means radius of the discs, $c$ the spacing of the balls from the axis of the discs.

10. A brake as claimed in claim 1, wherein the tractor includes rear wheels and each operating disc on each respective stub axle of the rear wheels includes an operating shaft, a lever keyed to said shaft, and wherein the said operating shafts are coaxial and have their adjacent ends reaching beyond a case enclosing a differential unit on one side of the latter, the said ends carrying each an arm for connection to a linkage hinged to the operating pedal.

References Cited

UNITED STATES PATENTS 2,020,809  11/1935  Stock _____ 188—72 X
2,786,560  3/1957  Ishoy.

FERGUS S. MIDDLETON, *Primary Examiner.*

G. E. A. HALVOSA, *Assistant Examiner.*